(12) United States Patent  (10) Patent No.: US 8,532,465 B2
Okazaki  (45) Date of Patent: Sep. 10, 2013

(54) MOVING IMAGE RECORDING APPARATUS, MOVING IMAGE RECORDING METHOD AND PROGRAM

(75) Inventor: Toru Okazaki, Chiba (JP)

(73) Assignee: Sony Corporation

( * ) Notice: Subject to any disclaimer, the term of this patent is extended or adjusted under 35 U.S.C. 154(b) by 286 days.

(21) Appl. No.: 12/804,369

(22) Filed: Jul. 20, 2010

(65) Prior Publication Data

US 2011/0044663 A1  Feb. 24, 2011

(30) Foreign Application Priority Data

Aug. 19, 2009 (JP) ................ P2009-190104

(51) Int. Cl.
*H04N 5/92* (2006.01)

(52) U.S. Cl.
USPC .......................................... 386/249; 386/251

(58) Field of Classification Search
None
See application file for complete search history.

(56) References Cited

U.S. PATENT DOCUMENTS

| 2005/0063601 A1* | 3/2005 | Kamata et al. ................ 382/243 |
| 2005/0235030 A1* | 10/2005 | Lauckhart et al. ............ 709/200 |
| 2007/0140662 A1* | 6/2007 | Nunomaki .................... 386/107 |
| 2008/0212892 A1* | 9/2008 | Doida et al. .................. 382/274 |
| 2008/0288509 A1* | 11/2008 | Mysen et al. ................. 707/100 |
| 2010/0121844 A1* | 5/2010 | Slaney et al. ................. 707/723 |

FOREIGN PATENT DOCUMENTS

JP  2007-324855 A  12/2007

* cited by examiner

*Primary Examiner* — Huy T Nguyen
*Assistant Examiner* — Eileen Adams
(74) *Attorney, Agent, or Firm* — Sony Corporatioionon

(57) ABSTRACT

There is provided a moving image recording apparatus including a feature amount extracting unit which extracts plural types of feature amount data relating to feature amounts characterizing moving image data from the moving image data, a memory unit at which the plural types of feature amount data extracted by the feature amount extracting unit and the moving image data are recorded being mutually associated, and a duplicate content searching unit which searches duplicate contents being mutually duplicated moving image data out of a plurality of the moving image data stored in the memory unit based on the plural types of feature amount data.

17 Claims, 11 Drawing Sheets

1: MOVING IMAGE DELIVERY SYSTEM

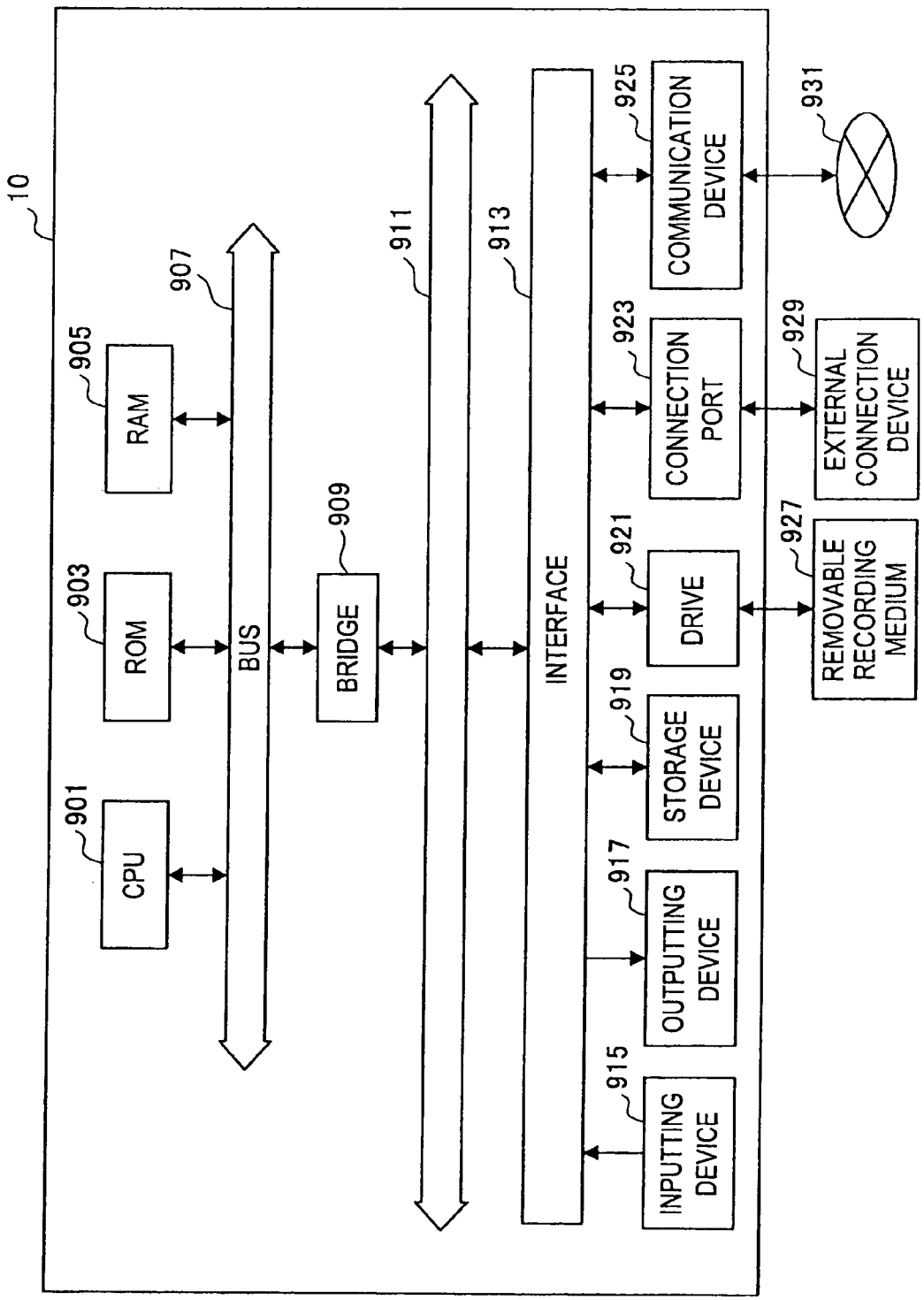

MOVING IMAGE RECORDING APPARATUS, MOVING IMAGE RECORDING METHOD AND PROGRAM

CROSS-REFERENCE TO RELATED APPLICATION

The present application claims priority from Japanese Patent Application No. JP 2009-190104 filed in the Japanese Patent Office on Aug. 19, 2009, the entire content of which is incorporated herein by reference.

BACKGROUND OF THE INVENTION

1. Field of the Invention

The present invention relates to a moving image recording apparatus, a moving image recording method and a program.

2. Description of the Related Art

In recent years, a recording apparatus having a function to automatically record a broadcast program satisfying a condition corresponding to a keyword previously registered by a user, which is a so-called keyword recording function, has been known. However, there has been an issue that the recording apparatus having such a function records a rerun of the program in duplicate when a program is rebroadcasted, for example.

Japanese Patent Application Laid-Open No. 2007-324855 has disclosed a technology to convert audio data into text data of a main part broadcast for a predetermined time after being switched to the main broadcast form a commercial broadcast and to determine duplication of broadcast programs based on the obtained text data.

SUMMARY OF THE INVENTION

However, with the technology disclosed in Japanese Patent Application Laid-Open No. 2007-324855, there has been an issue that a circuit, a program and the like to execute an audio recognition technology need to be added to a recording apparatus since a so-called audio recognition technology having heavy load is necessary to be performed at the time of converting the audio data into the text data. Accordingly, cost is to be increased due to mounting a function of the audio recognition technology which is different from a primary function of the recording apparatus.

In light of the foregoing, it is desirable to provide a novel and improved moving image recording apparatus, a moving image recording method and a program which are capable of accurately searching contents recorded in duplicate while suppressing cost increase.

According to an embodiment of the present invention, there is provided a moving image recording apparatus including a feature amount extracting unit which extracts plural types of feature amount data relating to feature amounts characterizing moving image data from the moving image data, a memory unit at which the plural types of feature amount data extracted by the feature amount extracting unit and the moving image data are recorded being mutually associated, and a duplicate content searching unit which searches duplicate contents being mutually duplicated moving image data out of a plurality of the moving image data stored in the memory unit based on the plural types of feature amount data.

The feature amount extracting unit preferably extracts feature amount data relating to audio data contained in the moving image data and feature amount data relating to image data contained in the moving image data.

The duplicate content searching unit preferably deletes the corresponding moving image data from the memory unit until the moving image data is not duplicated, in a case that duplicate contents exist in the memory unit.

The duplicate content searching unit may calculate similarity degree between the feature amount data being associated respectively with arbitrary two of the moving image data and determine that the duplicate contents exist when the similarity degree is equal to or larger than a predetermined threshold value.

The feature amount extracting unit preferably extracts, as the feature amount data, volume information obtained by sampling audio data contained in the moving image data at predetermined intervals and caption information relating to time at which a caption is displayed in the moving image corresponding to the moving image data.

The feature amount extracting unit may calculate the similarity degree by utilizing some of the moving image data corresponding at least to a time segment being a part of the feature amount data.

The feature amount extracting unit may further extract, as the feature amount data, commercial segment information relating to time at which a commercial is detected in the moving image corresponding to the moving image data, and the duplicate content searching unit may calculate the similarity degree excluding the time at which the commercial is detected from one, two or more extracted feature amount data.

The feature amount extracting unit may further extract, as the feature amount data, scene change information relating to time at which a scene change occurs in the moving image corresponding to the moving image data.

The feature amount extracting unit may further extract, as the feature amount data, flesh color detection information relating to time at which a flesh color part being equal to or larger than a predetermined ratio occurs in the moving image corresponding to the moving image data.

The moving image recording apparatus may further include a feature amount data transmitting/receiving unit which performs transmitting and receiving of the feature amount data with an information processing apparatus arranged outside the moving image recording apparatus. The duplicate content searching unit may perform searching of the duplicate contents by further utilizing the feature amount data obtained from the information processing apparatus.

According to an other embodiment of the present invention, there is provided a moving image recording method including the steps of extracting plural types of feature amount data relating to feature amounts characterizing moving image data from the moving image data, recording the extracted plural types of feature amount data and the moving image data in a memory unit being mutually associated, and searching duplicate contents being mutually duplicated moving image data out of a plurality of the moving image data stored in the memory unit based on the plural types of feature amount data.

According to an other embodiment of the present invention, there is provided a program for causing a computer to perform as a feature amount extracting function to extract plural types of feature amount data relating to feature amounts characterizing moving image data from the moving image data, a moving image data recording function to record the extracted plural types of feature amount data and the moving image data being mutually associated, and a duplicate content searching function to search duplicate contents being mutually duplicated moving image data out of a plurality of the recorded moving image data based on the plural types of feature amount data.

As described above, according to the present invention, it is possible to accurately search contents recorded in duplicate while suppressing cost increase.

BRIEF DESCRIPTION OF THE DRAWINGS

FIG. 11 is a block diagram which illustrates a hardware configuration of the moving image recording apparatus according to an embodiment of the present invention.

DETAILED DESCRIPTION OF THE EMBODIMENT(S)

Figure 1:
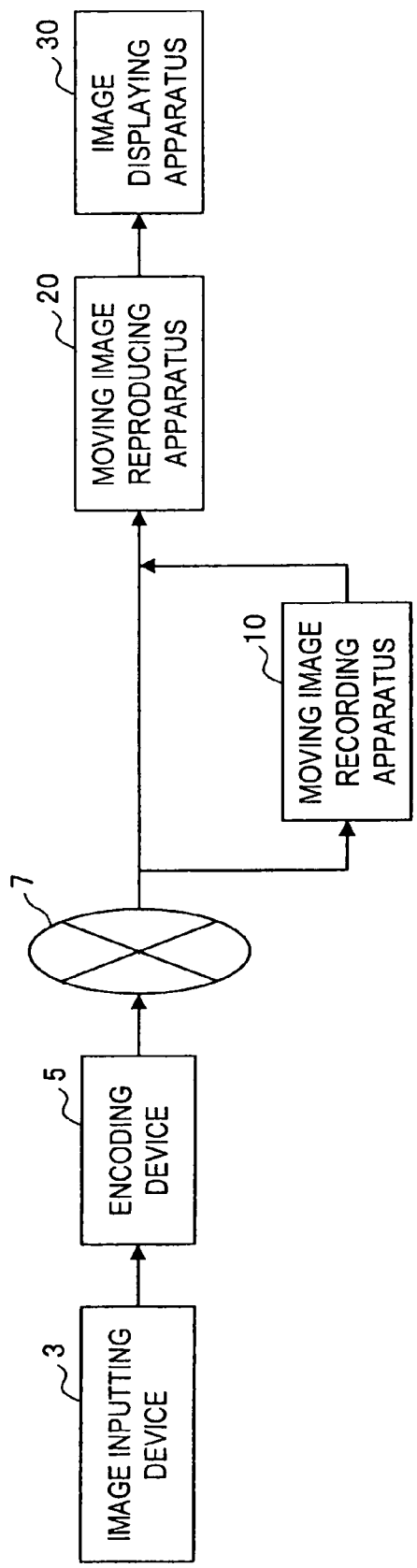
FIG. 1 is an explanatory view which illustrates a moving image delivery system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Description will be made in the following order.
(1) Concept
(2) First embodiment
(2-1) Moving image delivery system
(2-2) Configuration of moving image recording apparatus
(2-3) Moving image recording method
(2-4) First modified example
(3) Hardware configuration of moving image recording apparatus according to embodiment of the present invention
(4) Summary (Concept)

Prior to description of a moving image recording apparatus and a moving image recording method according to an embodiment of the present invention, concepts of the present invention will be described in detail.

In recent years, apparatuses handling moving image data as digital data are becoming popular in both information distribution at a broadcast station or the like, and information reception at ordinary home. In order to effectively transmit and store information, a method such as a moving picture experts group (MPEG) compressing with an orthogonal transform of a discrete cosine transform and a motion-compensation is adopted by utilizing redundancy being inherent to moving image information.

In particular, MPEG-2 (ISO/IEC13818-2) has been defined as a general moving image encoding method. The method is a standard covering both of an interlaced scan image and a non-interlaced scan image, a standard resolution image and a high definition image. Accordingly, the method is spread to a wide range of applications for professional use and consumer use.

By utilizing an MPEG-2 compression method, both of the high compression rate and excellent image quality can be achieved. For example, with an interlaced scan image of standard resolution having 720×480 pixels, it is possible to allocate a code rate (i.e., bit-rate) of 4 to 8 Mbps. Further, with an interlaced scan image of high resolution having 1920× 1088 pixels, it is possible to allocate a code rate of 18 to 22 Mbps.

MPEG-2 has been targeted to high quality encoding mainly applicable for broadcasting but not for an encoding method having a lower code rate (i.e., bit-rate) than MPEG-1, that is, having higher compression rate. It is considered that needs of such an encoding method will increase in accordance with popularization of portable terminals. An encoding method of MPEG-4 was standardized corresponding to the above. In December of 1998, the standard of the image encoding method was authorized as an international standard of ISO/IEC 14496-2.

Subsequent to a MPEG method, an encoding method achieving a higher compression rate called a joint video team (JVT) and an encoding method called VC-1 have been proposed. In these compression methods, high compression rate is achieved by performing a motion-compensation and an orthogonal transform such as a discrete cosine transform (DCT) and a Hadamard transform and performing quantization of the respectively obtained moduli.

Currently, the MPEG method is mainly utilized as the moving image encoding method for the digital terrestrial broadcast and the BS/CS digital broadcast. A moving image recording apparatus (i.e., a recorder) to receive moving image data and to record in a hard disk or a disk medium such as recordable DVD/BD records the received moving image encoded signal in the form without modification. Further, it is also possible for the moving image recording apparatus to record the received moving image data after increasing the compression rate to some extent even with sacrificing image quality by re-encoding in any one of methods of MPEG, JVT and VC-1 corresponding to a user's style of usage.

Some of these moving image recording apparatuses are provided with a function to accept registration of a user's favorite talent, a category and a keyword by utilizing described information in an electronic program guide such as an electronic program guide (EPG). Such a moving image recording apparatus automatically records a program with a scene of the registered talent, a program of the registered category, a program including the registered keyword and the like. Further, some of the moving image recording apparatuses are provided with a function to estimate preference of a user from an electronic program guide information of the program which was actually timer-recorded by the user and to automatically record a program of a similar type.

With the moving image recording apparatus having such functions, programs which may be favorable for a user are recorded one after another without setting timer-recording each time. Therefore, user's convenience can be dynamically improved. However, there is an issue that capacity of a storage device such as an internal hard disk drive becomes easily saturated without being managed. As a result, the user is to be forced to select and delete unnecessary programs from all of the recorded programs. There may be a case that a rerun of a previously recorded program is to be recorded. What is more, in the case that such a program is a type of a regular program being broadcasted every week, it is not easy to recognize when the rerun was broadcasted from the electronic program guide information. Accordingly, the user performs operation to check the nature by viewing a limited part thereof and to delete when duplication exists. Such operation results in waste of time.

In light of foregoing, a function of the moving image recording apparatus to automatically search duplicate programs and to report to a user is desirable to lighten burden of user's operation. However, several issues exist to actualize the function as described in the following.

First, in the case of trying to search duplication from program information of an electronic program guide, there is high possibility that the searching may not be performed well on regular programs broadcasted at predetermined intervals, as described above. Since the program of each time has the same title, there may be a case that all of the programs are considered to be duplicate even with different natures. Further, there is a case that a user subscribed to a cable television company records a program by inputting a video signal to a moving image recording apparatus by using an external input terminal via a set top box (STB). In this case, the program information of an electronic program guide may not be used in the first place.

Further, in the case of trying to search duplicate programs based on moving image signals actually recorded in the moving image recording apparatus, a processing amount for searching duplicate programs is to be an issue. For recording the broadcasted moving image encoded signals in the moving image recording apparatus, there may be a case of recording without modification and a case of recording after re-encoding into another recording method or another bit-rate. Further, in the case that a rerun of a program broadcasted on ground-based broadcasting of a certain broadcast station is broadcasted on satellite broadcasting of the same broadcast station, even screen size is different and the compressed moving image signals for broadcasting is to be completely different. Therefore, with a method to compare the recorded moving image encoded signals without modification, it may be impossible to find out duplication. Here, it can be considered to decode all of the recorded moving image encoded signals and to perform comparison between the decoded moving image signals. However, this is not realistic because the processing amount becomes enormous and another issue of ensuring storage area for the decoded moving image signals of enormous size even being temporal occurs.

Further, in the case that target programs are broadcasted by a commercial station, a commercial message (hereinafter, abbreviated as a CM) broadcasted between programs becomes an issue. In most cases, CMs broadcasted between programs are different between the first broadcast and the rerun thereof. Accordingly, even when programs having the same nature are compared, there is a possibility to be determined as being different programs since the difference between the CM parts affects the comparison result.

In light of the foregoing, the present invention provides a moving image recording apparatus capable of finding out duplicate programs being substantially the same by utilizing a feature amount extracting function and the like which is previously mounted on the moving image recording apparatus while suppressing cost increase. A storage device thereof can be effectively utilized by notifying information relating to the detected duplicate programs of a user and deleting the duplicate program (hereinafter, also called a duplicate content).

(First Embodiment)
<Moving Image Delivery System>

First, an outline of a moving image delivery system according to the first embodiment of the present invention will be described in detail with reference to FIG. 1. FIG. 1 is an explanatory view illustrating the moving image delivery system according to the present embodiment.

The moving image delivery system 1 according to the present embodiment includes an image inputting device 3, an encoding device 5, a moving image recording apparatus 10, a moving image reproducing apparatus 20 and an image displaying apparatus 30, as illustrated in FIG. 1 for example. In FIG. 1, the moving image recording apparatus 10, the moving image reproducing apparatus 20 and the image displaying apparatus 30 are illustrated only one each. However, the apparatuses may be disposed respectively in plural within the moving image delivery system 1. Similarly, although the image inputting device 3 and the encoding device 5 are illustrated only one each in FIG. 1, the devices may be disposed respectively in plural within the moving image delivery system 1.

The image inputting device 3 is possessed by a deliverer to deliver a moving image (hereinafter, also called a content). The image inputting device 3 converts the input moving image to a digital signal and outputs thereafter. The output data corresponding to the moving image is imputed to the encoding device 5.

The encoding device 5 compresses the digitalized moving image data by utilizing an orthogonal transform, such as a discrete cosine transform and a Hadamard transform, and a motion-compensation technology and generates frame image data (i.e., a bit stream). Subsequently, the encoding device 5 modulates the generated frame image data and delivers via a later-mentioned transmitting medium 7.

In a case that the data output from the image inputting device 10 is not necessarily encoded, the data output from the image imputing device 10 may be delivered through the transmitting medium 7 as the moving image data which is not encoded.

As the above transmitting medium 7, a satellite broadcast wave, a cable television network, a telephone line network, a cellular phone line network and the like can be adopted, for example. Further, the above transmitting medium may be a recording medium such as an optical disk, a magnetic disk and a semiconductor memory.

The moving image recording apparatus 10 records the moving image data delivered via the transmitting medium 7. Since the moving image data is recorded by the moving image recording apparatus 10, a user can view the recorded moving image at arbitral timing when the user desires to view the moving image not at the timing when the moving image corresponding to the moving image data (i.e., a content as a program and the like) is delivered. The moving image recording apparatus 10 will be described in detail anew in the following.

The moving image reproducing apparatus 20 expands the encoded data by utilizing an inverse transform of the orthogonal transform for encoding and the motion compensation and generates the frame image data after decoding the delivered moving image data. Subsequently, the moving image reproducing apparatus 20 reproduces the generated frame image data and displays at the later-mentioned image displaying apparatus 30.

The image displaying apparatus 30 displays the frame image data reproduced by the moving image reproducing apparatus 20 at a displaying unit provided at the image displaying apparatus 30. Accordingly, since the moving image corresponding to the frame image data is displayed at the displaying unit, a user can view the moving image content delivered via the transmitting medium 7.

In the case of FIG. 1, the moving image recording apparatus 10, the moving image reproducing apparatus 20 and the image displaying apparatus 30 are arranged respectively as a separate apparatus. However, the embodiment of the present invention is not limited to the case of FIG. 1. That is, the moving image recording apparatus 10 may further include the function of the moving image reproducing apparatus 20 or may further include the functions of the moving image reproducing apparatus 20 and the image displaying apparatus 30. Further, the image displaying apparatus 30 may include the function of the moving image reproducing apparatus 20.

In the above, the configuration of the moving image delivery system 1 according to the present embodiment has been described. In the following, the moving image recording apparatus 10 included in the moving image delivery system 1 will be described in detail.

<Configuration of Moving Image Recording Apparatus>

Figure 2:
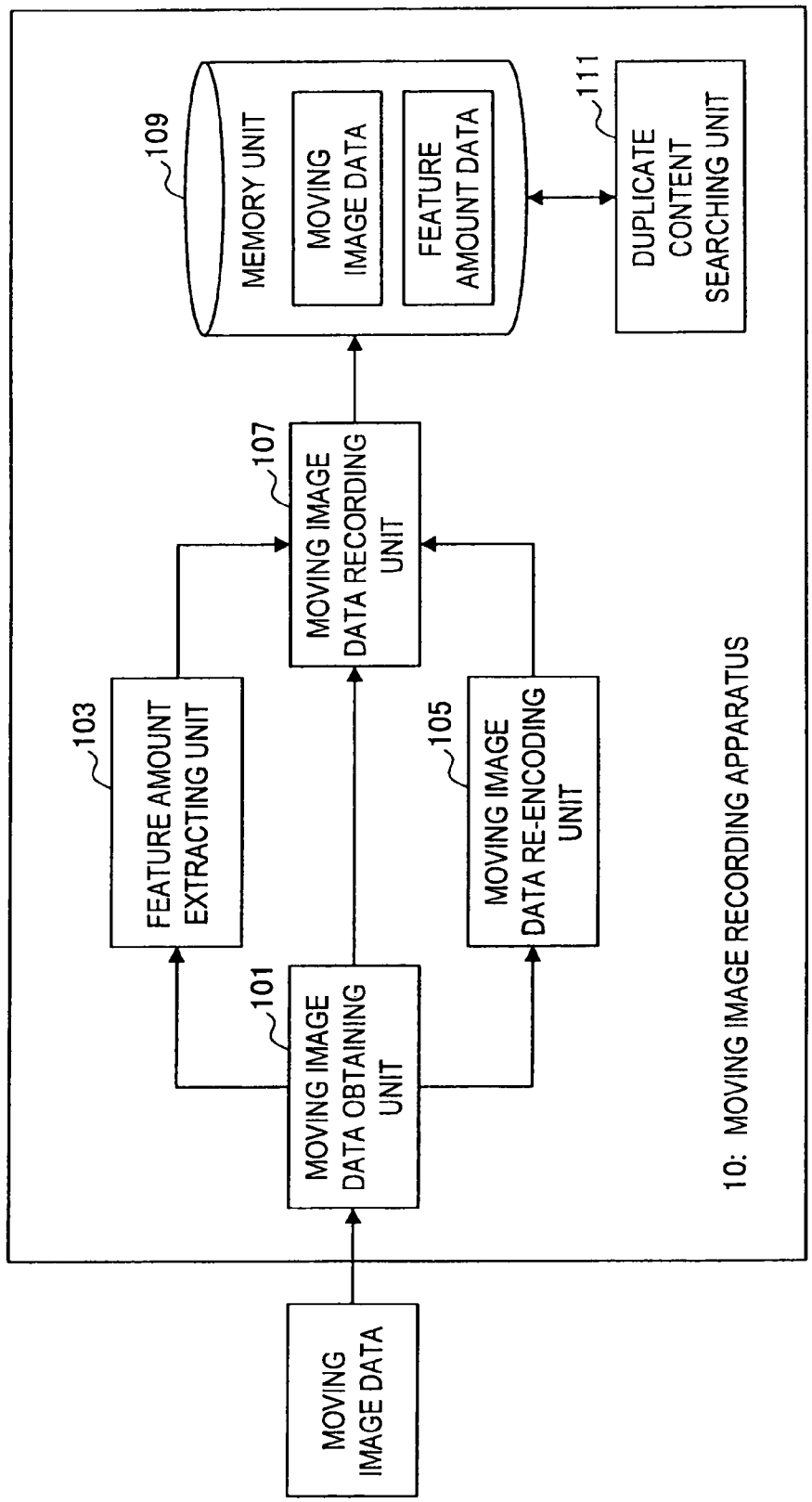
FIG. 2 is a block diagram which illustrates the configuration of the moving image recording apparatus according the embodiment.
Figure 3:
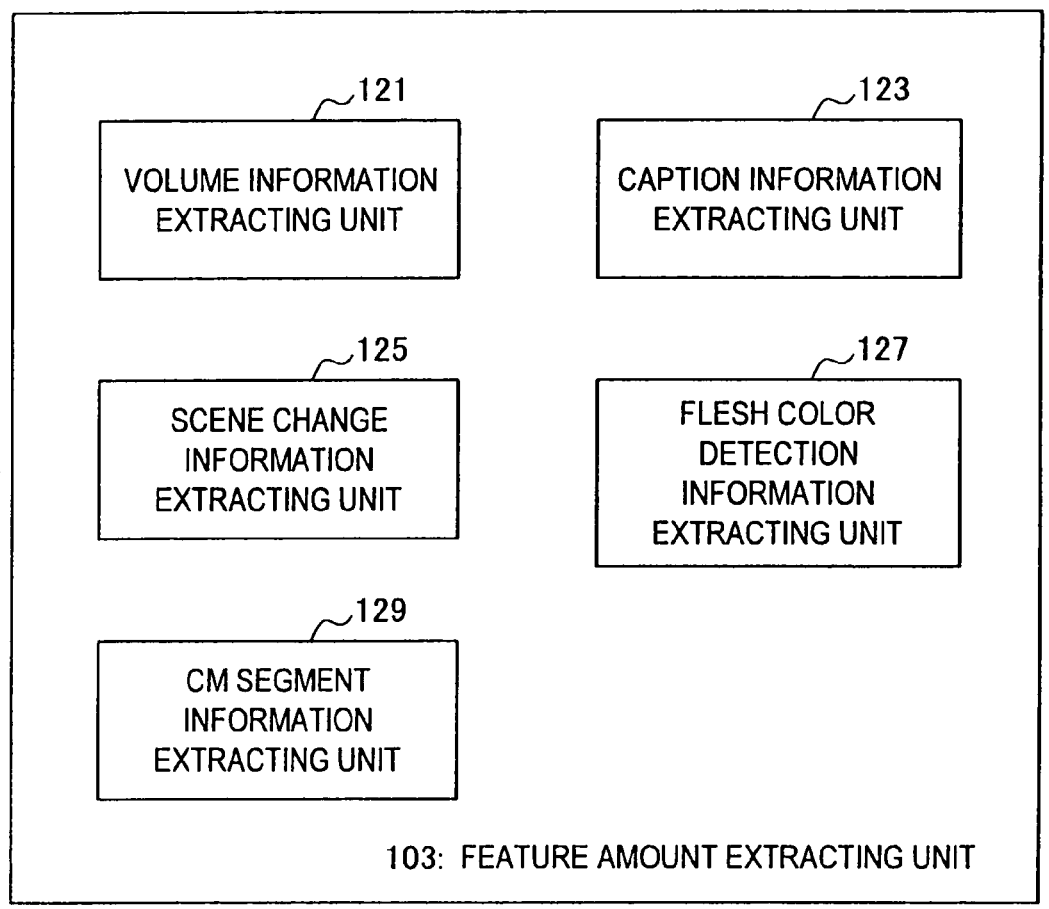
FIG. 3 is a block diagram which illustrates the configuration of a feature amount extracting unit according to the embodiment.
Figure 4:
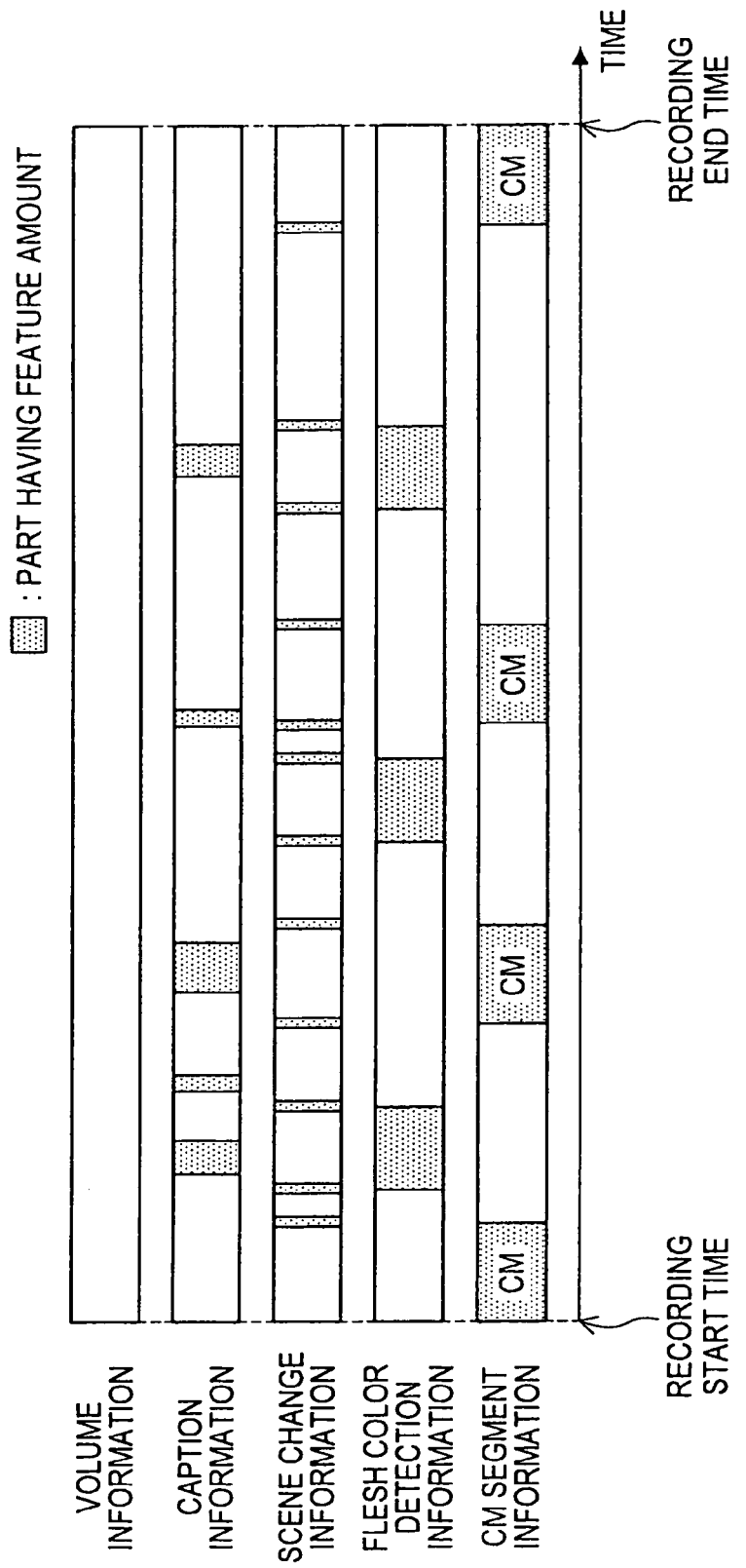
FIG. 4 is an explanatory view which illustrates feature amount data.
Figure 5:
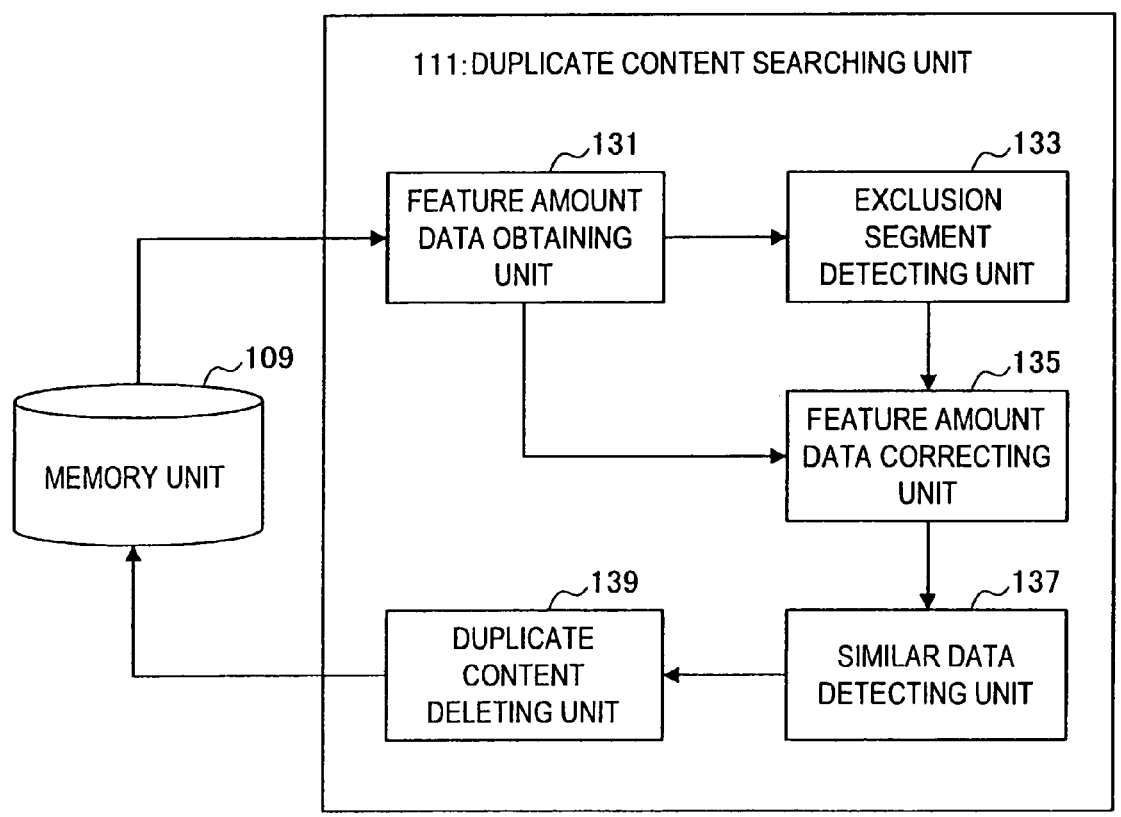
FIG. 5 is a block diagram which illustrates the configuration of a duplicate content searching unit according to the embodiment.
Figure 6:
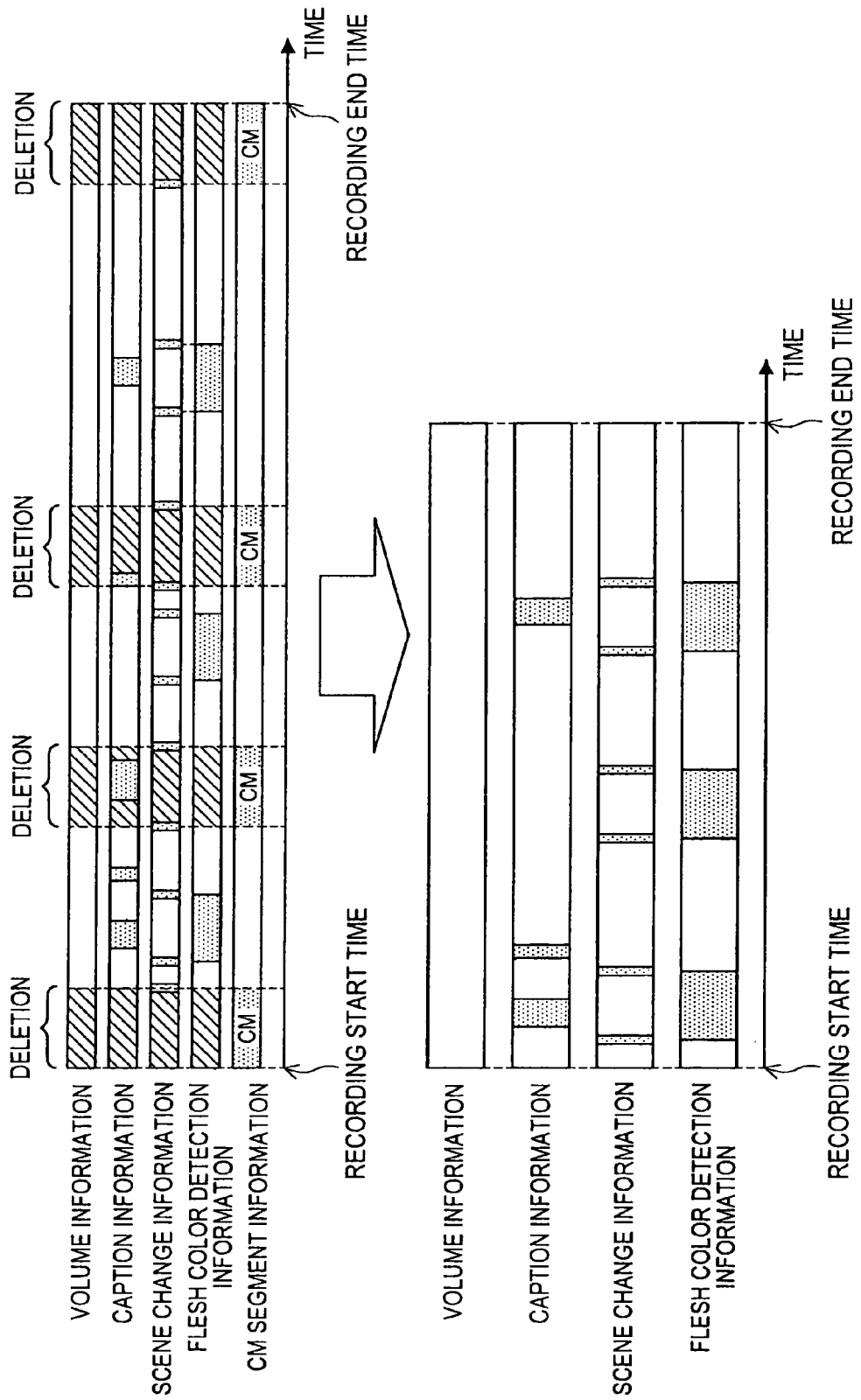
FIG. 6 is an explanatory view which illustrates feature amount data.

The configuration of the moving image recording apparatus 10 according to the present embodiment will be described in detail with reference to FIGS. 2 to 6. FIG. 2 is a block diagram illustrating the configuration of the moving image recording apparatus 10 according to the present embodiment. FIG. 3 is a block diagram illustrating the configuration of a feature amount extracting unit according to the present embodiment. FIG. 4 is an explanatory view explaining feature amount data. FIG. 5 is a block diagram illustrating the configuration of a duplicate content searching unit according to the present embodiment. FIG. 6 is an explanatory view explaining the feature amount data.

The moving image recording apparatus 10 according to the present embodiment mainly includes a moving image data obtaining unit 101, a feature amount extracting unit 103, a moving image data re-encoding unit 105, a moving image data recording unit 107, a memory unit 109 and a duplicate content searching unit 111, as illustrated in FIG. 2 for example.

The moving image data obtaining unit 101 is actualized with a central processing unit (CPU), a read only memory (ROM), a random access memory (RAM), a communication device and the like, for example. The moving image data obtaining unit 101 obtains the delivered moving image data (more specifically, the modulated and encoded moving image data) via the transmitting medium 7. The moving image data obtaining unit 101 may temporally store the obtained moving image data in the memory device such as the RAM, the later-mentioned memory unit 109 or the like.

The moving image data obtaining unit 101 transmits the obtained moving image data to the later-mentioned feature amount extracting unit 103. Further, when an instruction to perform re-encoding of the moving image data is input by a user, the moving image data obtaining unit 101 transmits the obtained moving image data to the later-mentioned moving image data re-encoding unit 105. When such instruction to perform re-encoding is not input, the moving image data obtaining unit 101 transmits the obtained moving image data to the later-mentioned moving image data recording unit 107.

The feature amount extracting unit 103 is actualized with a CPU, a ROM, a RAM and the like, for example. The feature amount extracting unit 103 extracts data relating to a feature amount indicating a feature of the moving image corresponding to the moving image data for each moving image data (that is, for each delivered program) based on the moving image data transmitted from the moving image data obtaining unit 101. More specifically, the feature amount extracting unit 103 extracts the feature amount indicating the feature of the moving image (i.e., a feature amount relating to video of the moving image and a feature amount relating to audio of the moving image) after decoding the transmitted moving image data as necessary.

The feature amount extracting unit 103 further includes a volume information extracting unit 121, a caption information extracting unit 123, a scene change information extracting unit 125, a flesh color detection information extracting unit 127 and a CM segment information extracting unit 129, as illustrated in FIG. 3 for example.

The respective processing units extract data relating to the feature amounts indicating features of the moving image (hereinafter, called feature amount data) by being operated separately or being operated in conjunction with one another.

The volume information extracting unit 121 is actualized with a CPU, a ROM, a RAM and the like, for example. The volume information extracting unit 121 extracts information relating to a volume of the moving image data (that is, information relating to excitement of the moving image) based on the audio data contained in the moving image data. More specifically, the volume information extracting unit 121 extracts volume information of the moving image data by referring to global gain and the like of the moving image data (i.e., the audio data). That is, the volume information can be perceived as the information obtained by sampling the audio data contained in the moving image data at constant intervals.

In a program (i.e., a content), it is supposed that the volume output at an excited part in the program is to be large. Accordingly, by analyzing a state of volume of the audio data contained in the moving image data, variation of excitement degree with time during the program can be perceived. The volume information may be a value to indicate the volume itself of the extracted audio data or may be a value to indicate a level as classifying the volume into several levels.

The caption information extracting unit 123 is actualized with a CPU, a ROM, a RAM and the like, for example. The caption information extracting unit 123 refers to data relating to a caption contained in the transmitted moving image data (hereinafter, abbreviated as caption data) and forms caption information by extracting whether or not a caption exists within a program and the time at which the caption has been displayed in the case that the caption exists. The caption information is indicated as binary information whether or not a caption exists at each time in the moving image.

The scene change information extracting unit 125 is actualized with a CPU, a ROM, a RAM and the like, for example. The scene change information extracting unit 125 forms scene change information by determining whether or not a scene change occurs as focusing on two frame images contained in the transmitted moving image data. More specifically, the scene change information extracting unit 125 calculates a difference between a currently focused frame image and a frame image at the next previous position and determines whether or not the calculated difference is equal to or larger than a predetermined threshold value. When the calculated difference is equal to or larger than the predetermined threshold value, the scene change information extracting unit 125 determines that a large screen change occurs (i.e., that a scene change occurs). Meanwhile, when the calculated difference is smaller than the predetermined threshold value, the scene change information extracting unit 125 determines that a large screen change does not occur (i.e., that a scene change does not occur). The scene change information is indicated as binary information whether or not a scene change occurs at each time in the moving image.

The flesh color detection information extracting unit 127 is actualized with a CPU, a ROM, a RAM and the like, for example. The flesh color detection information extracting unit 127 extracts flesh color detection information relating to time at which flesh color part having a ratio equal to or larger than a predetermined ratio is detected based on the transmitted moving image data. More specifically, the flesh color detection information extracting unit 127 focuses on a pixel value of a pixel constituting each image contained in the moving image data and determines whether or not the focused pixel is to be displayed as flesh color. When the part to be displayed as flesh color occupies to be equal to or larger than the predetermined ratio in the focused image, the flesh color detection information extracting unit 127 determines that the flesh color part is detected. The flesh color detection information is indicated as binary information whether or not a flesh color part being equal to or larger than the predetermined ratio exists at each time in the moving image.

The CM segment information extracting unit 129 is actualized with a CPU, a ROM, a RAM and the like, for example. The CM segment information extracting unit 129 extracts information indicating a segment corresponding to a CM (hereinafter, called the CM segment information) in the moving image data based on the transmitted moving image data. For example, a segment corresponding to a CM (i.e., a CM segment) is possible to be defined as follows.

For example, the CM segment information extracting unit 129 refers to the volume information extracted by the volume information extracting unit 121 and defines time at which the volume is equal to or smaller than a threshold value to be determined as silence. Further, the CM segment information extracting unit 129 refers to the scene change information extracted by the scene change information extracting unit 125 and defines time at which a scene change occurs. In transition from a main part to a CM or from a CM to a main part, a silent state and a scene change are supposed to occur. Therefore, the CM segment information extracting unit 129 can extract a frame being a silent state with a scene change as a candidate frame of transition from a main part to a CM or from a CM to a main part. In many cases, a CM is broadcasted in a certain period (for example, 30 seconds). Accordingly, when the period between two candidate frames is close to the certain period, it is possible that a segment sandwiched by the two candidate frames is defined as a CM segment.

The CM segment information extracted as described above is indicated as binary information whether or not it is a CM segment at each time in the moving image.

An example of feature amount data extracted as described above is illustrated in FIG. 4. Each of the feature amount data is indicated in relation to relative time with reference to the top of the moving image data (i.e., the recording start time). Such feature amount data are considered to be mutually different as a whole among respective different moving image data (i.e., delivered different contents). Accordingly, as described later, comparing such feature amount data enables to easily perform determination of being a duplicate content or not.

Such feature amount data is extracted for each moving image data recorded in the moving image recording apparatus 10. Since the data size of the feature amount data is extremely smaller than that of the encoded moving image data, the capacity of the later-mentioned memory unit 109 is not squeezed.

By performing the feature amount extracting process as described above, the feature amount data characterizing the moving image data is extracted. The feature amount extracting unit 103 according to the present embodiment transmits the feature amount data extracted by respective processing units as illustrated in FIG. 3 to the later-mentioned moving image data recording unit 107.

Here, the processing unit to extract the above feature amount is not necessarily arranged specially for a searching process of duplicate contents which will be specifically described in the following. It is also possible to utilize a processing unit which is previously disposed to the moving image recording apparatus for another use. Further, the feature amount extracting unit 103 according to the present embodiment may extract the feature amount in accordance with a type of a feature amount extraction processing unit mounted on the moving image recording apparatus as not extracting all of the above feature amounts. Therefore, in the moving image recording apparatus 10 according to the present embodiment, the cost for mounting the feature amount extraction processing unit is reduced. It is preferred that the feature amount extracting unit 103 extracts at least the feature amount relating to video (for example, caption information) and the feature amount relating to audio (for example, volume information).

Here, the feature amount extracting processes performed by respective processing units disposed at the feature amount extracting unit 103 according to the present embodiment are not limited to the methods described in the above. It is also possible to utilize another arbitrary method. Further, the feature amount extracting unit 103 may extract a feature amount other than the above feature amounts.

In the above, the configuration of the feature amount extracting unit 103 according to the present embodiment has been described in detail. In the following, the moving image data re-encoding unit 105 disposed at the moving image recording apparatus 10 according to the present embodiment will be described in detail with reference to FIG. 2.

The moving image data re-encoding unit 105 is actualized with a CPU, a ROM, a RAM and the like, for example. When the moving image data is transmitted from the moving image data obtaining unit 101, the moving image data re-encoding unit 105 performs decoding of the transmitted moving image data (i.e., the encoded moving image data). Further, the moving image data re-encoding unit 105 re-encodes the moving image data obtained by being decoded based on a record rate specified by a user.

The moving image data re-encoding unit 105 transmits the encoded moving image data obtained through the re-encoding process to the later-mentioned moving image data recording unit 107.

The moving image recording unit 107 is actualized with a CPU, a ROM, a RAM and the like, for example. The moving image data recording unit 107 records the feature amount data transmitted from the feature amount extracting unit 103 being associated with the moving image data transmitted from the moving image data obtaining unit 101 or the moving image data re-encoding unit 105 to the later-mentioned memory unit 109. The moving image data recording unit 107 may record the moving image data and the feature amount data in the same storage area of the later-mentioned memory unit 109 or may separately store these data to different storage areas while maintaining association between the moving image data and the feature amount data. At that time, the moving image data recording unit 107 may further associate time information relating to when the recording to the memory unit 109 is performed with the recorded moving image data and feature amount data.

Further, the moving image data recording unit 107 may further associate metadata relating to a category, a performer or the like obtained from EPG with the moving image data to be recorded.

In this manner, the moving image recording apparatus 10 according to the present embodiment can record the moving image data obtained from the transmitting medium 7 at the recording rate specified by a user. When a user selects a mode to record in the highest image quality, the moving image data is recorded in the later-mentioned memory unit 109 for each program in the format without modification. In this case, the consuming amount of the storage area of the memory unit 109 is the maximum. However, since recording can be performed without deterioration due to re-compression, the quality of the delivered moving image data can be maintained.

Meanwhile, when the user selects a mode other than the maximum image quality, re-encoding is performed on the user-specified recording rate by the moving image data re-encoding unit 105. The re-encoded moving image data is recorded in the later-mentioned memory unit 109 as a moving image data for each program. Although such re-encoded data is inferior in image quality compared to the case of direct recording (i.e., the case of the highest quality recording), a more effective encoding method can also be utilized compared to the encoding method of the delivered moving image data. Accordingly, with the re-encoding process, the memory unit 109 such as a hard disk drive can be used effectively in capacity.

The memory unit 109 is an example of the memory device disposed at the moving image recording apparatus 10 according to the present embodiment. The memory unit 109 stores the moving image data and the feature amount data corresponding to the moving image data. In addition, the memory unit 109 appropriately records a variety of parameters and in-progress processes required to be stored for the moving image recording apparatus 10 according to the present embodiment to perform a certain process and a variety of databases. The memory unit 109 is capable of being freely read and written by the moving image data obtaining unit 101, the feature amount extracting unit 103, the moving image data re-encoding unit 105, the moving image data recording unit 107, the duplicate content searching unit 111 and the like.

The duplicate content searching unit 111 is actualized with a CPU, a ROM, a RAM and the like, for example. The duplicate content searching unit 111 searches duplicate contents being mutually duplicate moving image data among a plurality of moving image data stored in the memory unit 109 based on the feature amount data stored in the memory unit 109. The duplicate content searching unit 111 further includes a feature amount data obtaining unit 131, an exclusion segment detecting unit 133, a feature amount data correcting unit 135, a similar data detecting unit 137 and a duplicate content deleting unit 139, as illustrated in FIG. 5 for example.

The feature amount data obtaining unit 131 is actualized with a CPU, a ROM, a RAM and the like, for example. The feature amount data obtaining unit 131 obtains all of the feature amount data stored in the memory unit 109 and transmits to the exclusion segment detecting unit 133 and the feature amount data correcting unit 135 which are described in the following.

The exclusion segment detecting unit 133 is actualized with a CPU, a ROM, a RAM and the like, for example. When the feature amount data is transmitted from the feature amount data obtaining unit 131, the exclusion segment detecting unit 133 determines whether or not the CM segment information is contained in the transmitted feature amount data.

When the CM segment information is not contained in the feature amount data, the exclusion segment detecting unit 133 notifies to the later-mentioned feature amount data correcting unit 135 that a segment to be excluded is not detected.

Meanwhile, when the CM segment information is contained in the feature amount data, the exclusion segment detecting unit 133 specifies time of being the CM segment as referring to the CM segment information. Here, there may be a case that a CM is determined not being contained in the moving image (i.e., that data indicating existence of a CM segment in the CM segment information is not written) as a result of referring to the CM segment information. In this case, the exclusion segment detecting unit 133 notifies to the later-mentioned feature amount data correcting unit 135 that a segment to be excluded is not detected.

Meanwhile, in the case that the data indicating a CM segment is written in the CM segment information, the information relating to time of corresponding CM segment is transmitted to the later-mentioned feature amount data correcting unit 135.

The feature amount data correcting unit 135 is actualized with a CPU, a ROM, a RAM and the like, for example. When the time being the CM segment is transmitted from the exclusion segment detecting unit 133, the feature amount data correcting unit 135 deletes the feature amount data at the time being the CM segment from all of the focused feature amount data and elapsed time information added to the feature amount data is corrected.

Here, it is assumed that the CM segment information is contained in the feature amount data obtained from the memory unit 109 and the time being the CM segment is transmitted to the feature amount data correcting unit 135 from the exclusion segment detecting unit 133, as illustrated at the upper side of FIG. 6 for example. The CM segment information at the upper side of FIG. 6 contains four CM segments. Accordingly, the feature amount data correcting unit 135 deletes parts corresponding to the CM segments (i.e., shaded parts in FIG. 6) from the volume information, the caption information, the scene change information and the flesh color detection information. Consequently, new feature amount data having the parts corresponding to the CM segments deleted is generated as illustrated at the lower side of FIG. 6. Then, a discrete part occurs at the elapsed time information in each feature amount data having the parts corresponding to the CM segments deleted. Accordingly, the feature amount data correcting unit 135 corrects the elapsed time information for the new feature amount data illustrated in the lower side of FIG. 6 to new time information having the recording start time as the reference.

Even if respective main parts of contents are the same (for example, a firstly broadcasted program and a rerun thereof), there may be a case that CMs contained in the contents are different. Accordingly, since the broadcasted CMs are different, there may be a case that the contents substantially being the same are determined to be different. By deleting the CM segment possibly being a factor to cause erroneous determination from the feature amount data as described above, the duplicate content searching unit 111 according to the present embodiment is capable of performing searching the duplicate contents more accurately.

The feature amount data correcting unit 135 transmits, to the later-mentioned slimier data detecting unit 137, the feature amount data having the part corresponding to the CM segment deleted and having the new elapsed time information added.

On the other hand, when the feature amount data correcting unit 135 receives notification that the moving image does not contain a CM or the moving image data does not contain a segment to be excluded from the exclusion segment detecting unit 133, the above correction of the feature amount data is not performed. The feature amount data correcting unit 135 transmits the feature amount data transmitted from the feature amount data obtaining unit 131 to the later-mentioned similar data detecting unit 137 without modification.

The similar data detecting unit 137 is actualized with a CPU, a ROM, a RAM and the like, for example. The similar data detecting unit 137 calculates similarity based on all of the feature amount data transmitted from the feature amount data correcting unit 135 and detects similar moving image data. More specifically, the similar data detecting unit 137 selects one feature amount data to focus out of all of the transmitted feature amount data and calculates all similarities between the selected feature amount data and other feature amount data. Here, the similar data detecting unit 137 calculates the similarity by utilizing all of the feature amounts contained in the feature amount data transmitted from the feature amount data correcting unit 135.

Here, the calculated similarity may be anything as long as being capable of evaluating similarity degree between two feature amount data. A cross-correlation value, a difference sum such as a difference absolute value sum and a difference square sum, and the like are considered to be examples of the similarity.

When the calculated similarity is equal to or larger than a predetermined threshold value in the case of the cross-correlation value or is equal to or smaller than a predetermined threshold value in the case of the difference sum, the similar data detecting unit 137 determines that the two feature amounts are similar. The similar data detecting unit 137 totally determines whether or not the two feature amount data are similar by utilizing plural types of feature amounts contained in the feature amount data. For example, the similar data detecting unit 137 may determine that the two feature amount data are similar when feature amounts of a predetermined number or more are mutually similar among the plural types of feature amounts.

By performing such a process on all of the feature amount data, the similar data detecting unit 137 can detect whether or not duplication exists in the moving image data recorded in the memory unit 109.

As described above, since the data size of the feature amount data is extremely smaller than that of the moving image data itself, the above comparison calculation requires a short calculation time. Accordingly, compared to the case of performing the comparison calculation by utilizing the moving image data itself, load required for the calculation can be reduced.

When moving image data supposed to have approximately the same nature (i.e., duplicate contents) are detected, the similar data detecting unit 137 transmits the information of the detected duplicate contents to the later-mentioned duplicate content deleting unit 139. When duplicate contents are not detected, the similar data detecting unit 137 ends the process of searching duplicate contents.

The duplicate content deleting unit 139 is actualized with a CPU, a ROM, a RAM and the like, for example. When the information of the duplicate contents is transmitted from the similar data detecting unit 137, the duplicate content deleting unit 139 deletes the moving image data causing duplication from the memory unit 109 until the duplication vanishes. For example, when moving image data A and moving image data B are duplicate contents, the duplicate content deleting unit 139 deletes either the moving image data A or the moving image data B, so that duplication does not exist in the moving image data recorded in the memory unit 109.

Prior to performing the process of deleting the duplicate content, the duplicate content deleting unit 139 may call attention to a user by outputting a message, to the user, such as "High probability of being the same nature between program A and program N. Delete either one?".

At the time of deleting the duplicate content, the duplicate content deleting unit 139 may delete the content (i.e., the moving image data) specified by a user or the content which is automatically selected to delete out of the duplicate contents. In the case that the duplicate content deleting unit 139 automatically selects the content to be deleted, the deleting process may be performed to keep the newer content or to keep the older content.

By performing above processes, the moving image recording apparatus 10 according to the present embodiment is capable of organizing recorded programs without putting a load on a user.

As described above, the moving image recording apparatus 10 according to the present embodiment records feature amount data of respective programs having extremely small data size in addition to moving image data of recorded programs in a storage device such as a hard disk drive and searches duplicate programs by utilizing the feature amount data. Accordingly, with the moving image recording apparatus 10 according to the present embodiment, a user is not required to check whether a program is duplicate or not by reproducing program. Therefore, user's convenience can be further improved. Further, the function of the feature amount extracting process mounted on the moving image recording apparatus can also be used for extracting the feature amount data from the encoded moving image data without modification. Therefore, additional cost can be suppressed.

In addition to the above processing units, the moving image recording apparatus 10 according to the present embodiment may further include a moving image data transmitting unit (not illustrated) which transmits the moving image data recorded in the memory unit 109 to the moving image reproducing apparatus 20 capable of mutually communicating with the moving image recording apparatus 10. Further, the moving image data recorded in the memory unit 109 according to the present embodiment may be referred by the moving image reproducing apparatus 20 capable of mutually communicating with the moving image recording apparatus 10.

In the above, an example of functions of the moving image recording apparatus 10 according to the present embodiment has been described. Each of the above structural components may be constituted with general members and circuits or may be constituted with hardware specially prepared for the function thereof. Instead, it is also possible that all of the functions of the respective structural components are performed by a CPU and the like. The configuration to be adopted can be appropriately modified in accordance with the technology level at the time of actualizing the present embodiment.

Here, it is also possible to prepare a computer program to actualize each function as described above of the moving image recording apparatus according to the present embodiment and to mount the program on a personal computer and the like. Further, it is also possible to provide a recording medium capable of being read by a computer having such a computer program stored. For example, the recording medium is a magnetic disk, an optical disk, an optical magnetic disk, a flash memory or the like. Furthermore, the above computer program may be delivered via a network, for example, without utilizing a recording medium.

<Moving Image Recording Method>

Figure 7:
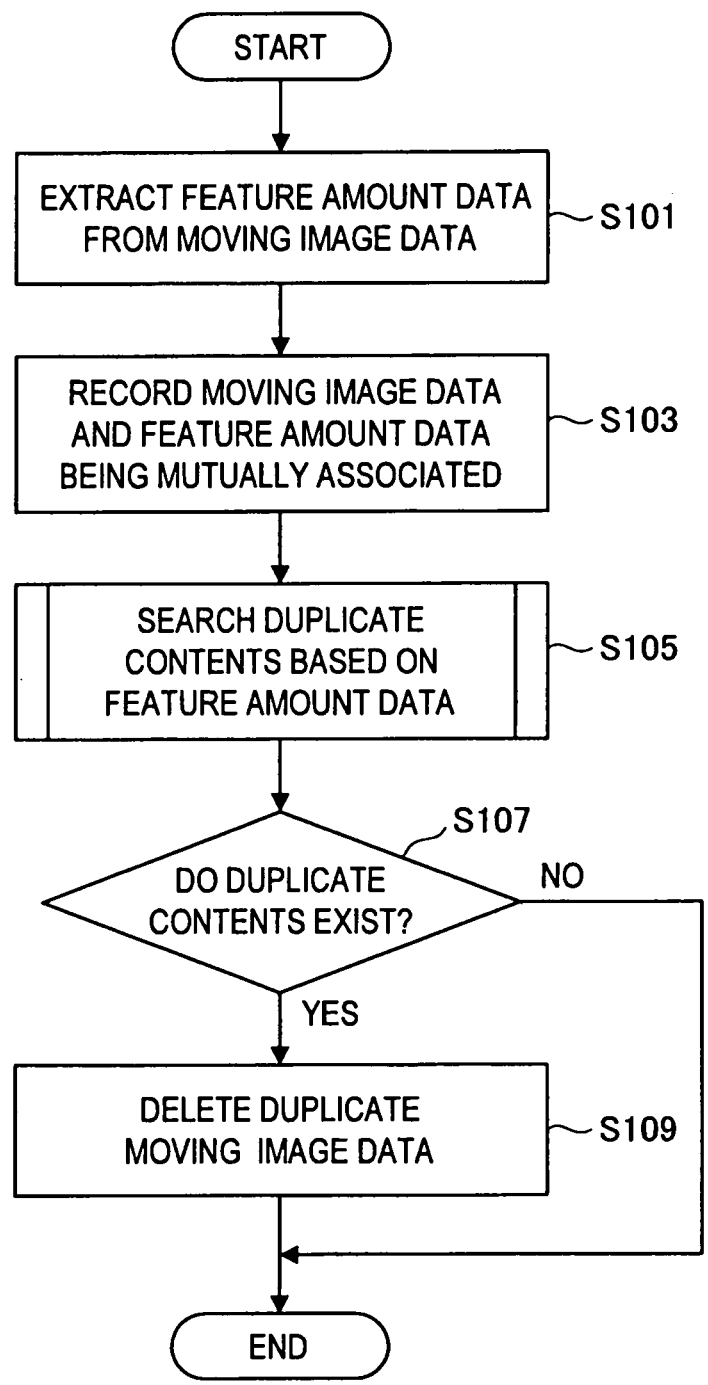
FIG. 7 is a flowchart which describes a moving image recording method according to the embodiment.
Figure 8:
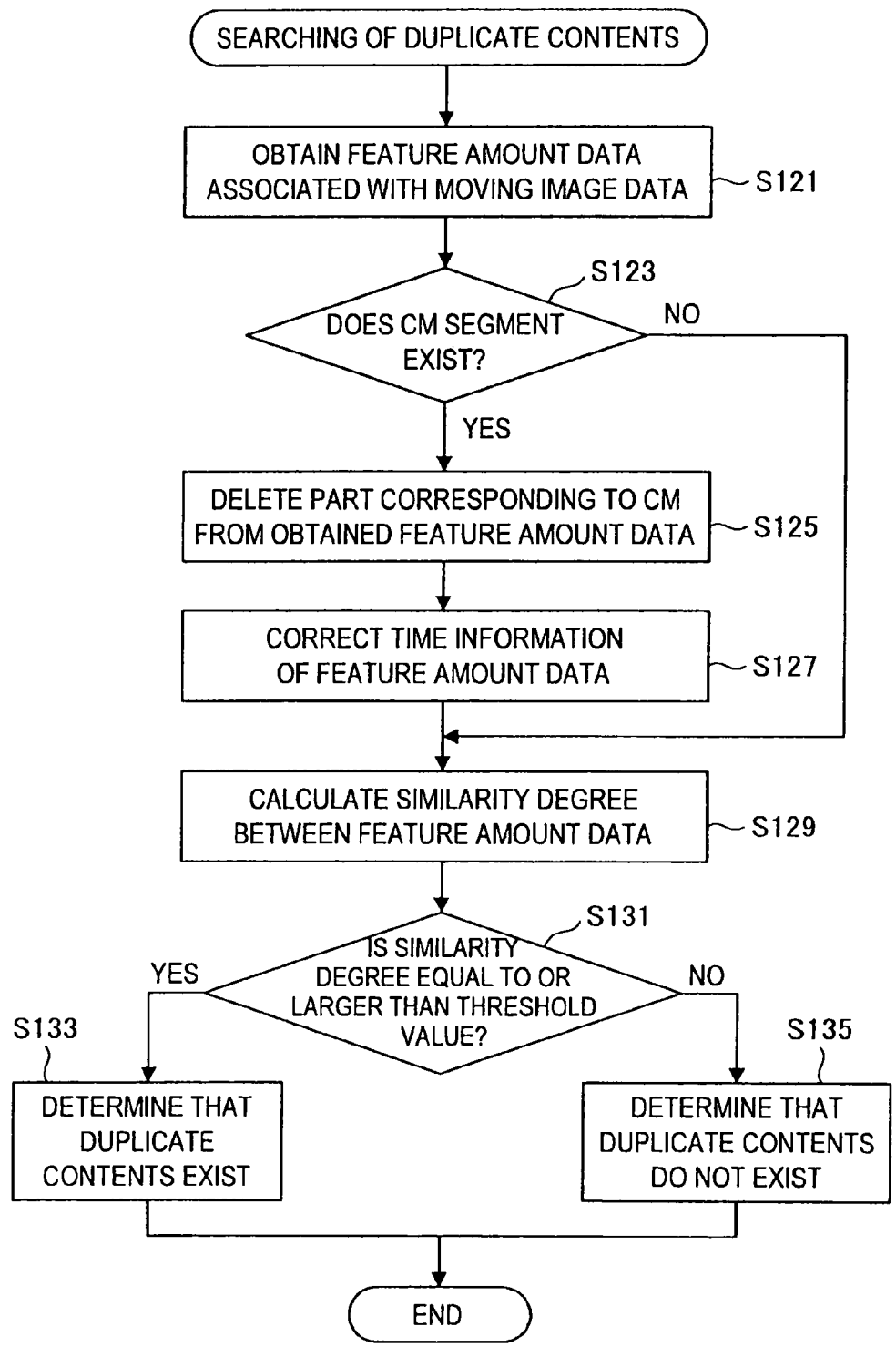
FIG. 8 is a flowchart which describes the moving image recording method according to the embodiment.

Next, a moving image recording method according to the present embodiment will be described in detail with reference to FIGS. 7 and 8. FIGS. 7 and 8 are flowcharts which describe the moving image recording method according to the present embodiment.

The general flow of the moving image recording method according to the present embodiment will be described in detail with reference to FIG. 7.

First, the moving image data obtaining unit 101 of the moving image recording apparatus 10 obtains the moving image data via the transmitting medium 7. The moving image data obtaining unit 101 transmits the obtained moving image data to the feature amount extracting unit 103.

The feature amount extracting unit 103 extracts the feature amount data relating to the feature amount such as the volume information, the caption information, the scene change information, the flesh color detection information and the CM segment information from the moving image data transmitted from the moving image data obtaining unit 101 (step S101). When extraction of the feature amount data is completed, the feature amount extracting unit 103 transmits the extracted feature amount data to the moving image data recording unit 107.

Next, the moving image data recording unit 107 records, in the memory unit 109, the feature amount data transmitted from the feature amount extracting unit 103 being associated with the moving image data transmitted from either the moving image data obtaining unit 101 or the moving image data re-encoding unit 105 (step S103).

Subsequently, the duplicate content searching unit 111 obtains all of the feature amount data recorded in the memory unit 109 and searches duplicate contents based on the feature amount data (step S105). Accordingly, the duplicate content searching unit 111 becomes capable of performing to determine whether or not the duplicate contents exist in the memory unit 109 (step S107). In the following, the flow of the searching process of the duplicate contents will be described anew in detail.

When determination result that duplicate contents do not exist in the memory unit 109 is obtained, the duplicate content searching unit 111 ends the process of searching duplicate contents.

Meanwhile, when determination result that duplicate contents exist in the memory unit 109 is obtained, the duplicate content searching unit 111 (more specifically, the duplicate content deleting unit 139) deletes the duplicate moving image data from the memory unit 109 (step S109).

In this manner, with the moving image recording method according to the present embodiment, moving image data can be prevented from being recorded in the memory unit 109 in duplicate.

Next, the flow of the process of searching duplicate contents will be described in detail with reference to FIG. 8.

First, the feature amount data obtaining unit 131 of the duplicate content searching unit 111 obtains all of the feature amount data associated with the moving image data recorded in the memory unit 109 (step S121). The feature amount data obtaining unit 131 transmits all of the obtained feature amount data to the exclusion segment detecting unit 133 and the feature amount data correcting unit 135.

Next, the exclusion segment detecting unit 133 refers to the transmitted feature amount data and determines whether or not a part corresponding to a CM segment exists in the transmitted feature amount data in which information relating to plural types of feature amounts is described (step S123).

When the part corresponding to the CM segment does not exist in the feature amount data, the exclusion segment detecting unit 133 notifies to the feature amount data correcting unit 135 that the part corresponding to the CM segment does not exist. When the notification that the part corresponding to the CM segment does not exist is performed, the feature amount data correcting unit 135 transmits the feature amount data transmitted from the feature amount data obtaining unit 131 to the similar data detecting unit 137 without modification. The similar data detecting unit 137 performs a later-mentioned step S129 based on the transmitted feature amount data.

On the other hand, when the part corresponding to the CM segment exists in the feature amount data, the exclusion segment detecting unit 133 notifies to the feature amount data correcting unit 135 that the part corresponding to the CM segment exists. When the notification that the part corresponding to the CM segment exists is performed, the feature amount data correcting unit 135 deletes the part corresponding to the CM segment respectively from the plural types of the feature amounts contained in the feature amount data (step S125). Subsequently, the feature amount data correcting unit 135 corrects the elapsed time information into new time information having the top of the feature amount data as the reference (step S127) in order to correct a discrete part caused as a result of deleting the part corresponding to the CM segment. Thereafter, the feature amount data correcting unit 135 transmits the corrected feature amount data to the similar data detecting unit 137.

The similar data detecting unit 137 calculates the similarity between feature amount data by utilizing the feature amount data transmitted from the feature amount data correcting unit 135 (step S129) and determines whether or not the calculated similarity is equal to or larger than the predetermined threshold value (step S131). When the calculated similarity is equal to or larger than the predetermined threshold value in several types of feature amounts, the similar data detecting unit 137 determines that duplicate contents exist (step S133). Meanwhile, when the calculated similarity is smaller than the predetermined threshold value in several types of feature amounts, the similar data detecting unit 137 determines that duplicate contents do not exist (step S135).

In this manner, the duplicate content searching unit according to the present embodiment can easily determine whether or not duplicate contents exist.

FIRST MODIFIED EXAMPLE

Figure 9:
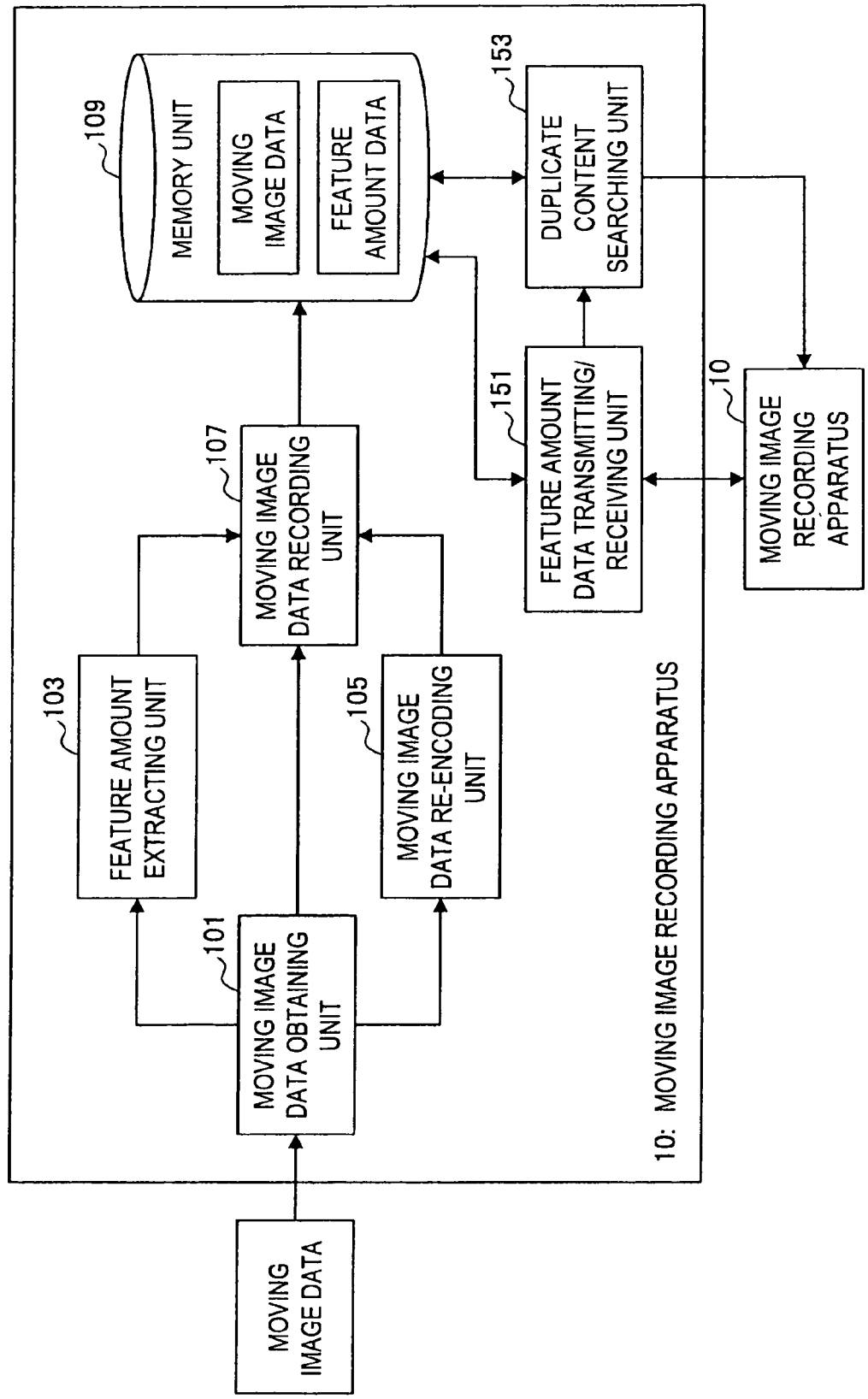
FIG. 9 is a block diagram which illustrates a moving image recording apparatus of a first modified example according to the embodiment.
Figure 10:
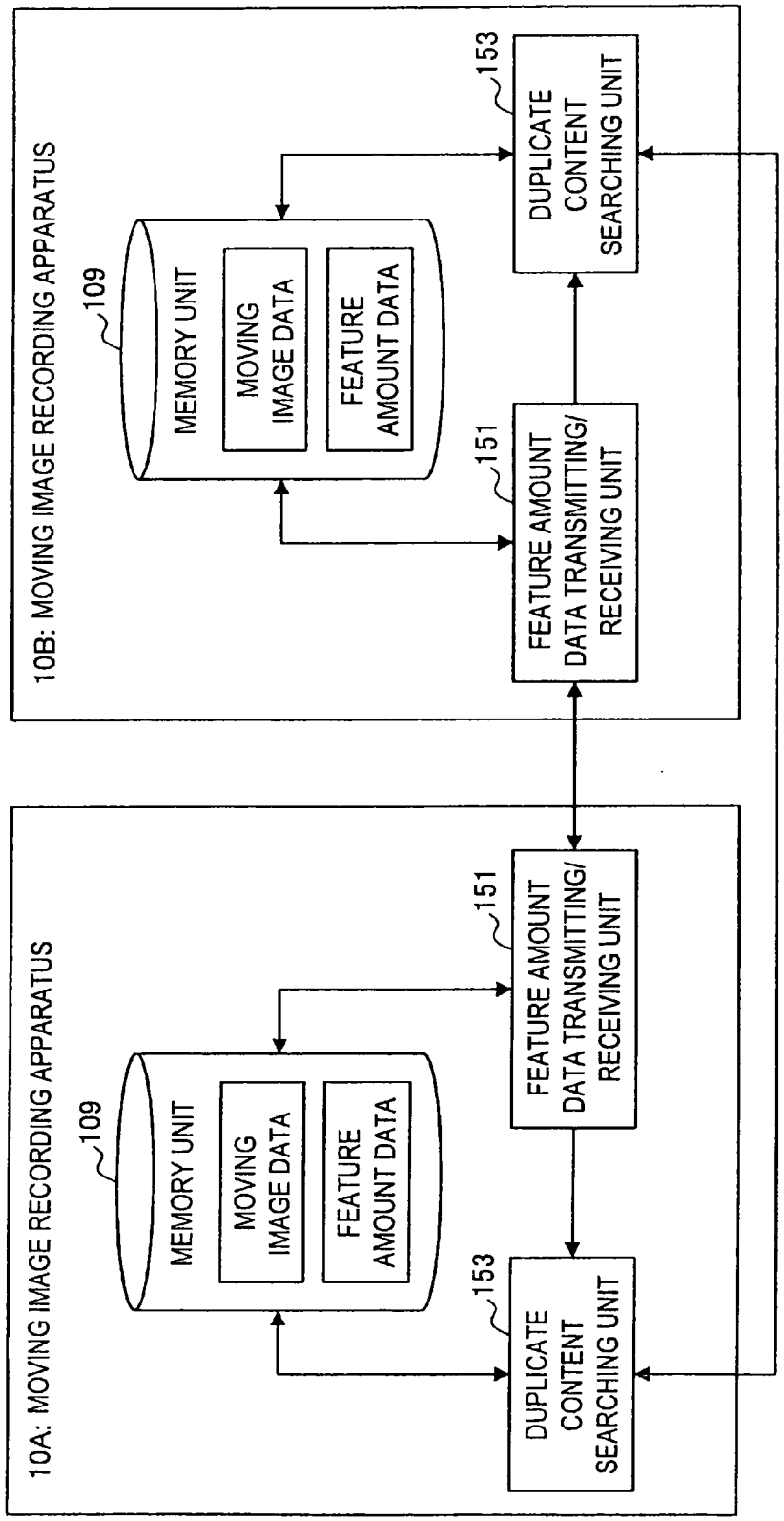
FIG. 10 is an explanatory view which illustrates the moving image recording apparatus according to the modified example.

Next, the first modified example of the moving image recording apparatus 10 according to the present embodiment will be described in detail with reference to FIGS. 9 and 10. FIG. 9 is a block diagram illustrating the configuration of the first modified example of the moving image recording apparatus 10 according to the present embodiment. FIG. 10 is an explanatory view explaining the moving image recording apparatus 10 according to the present modified example.

The moving image recording apparatus 10 according to the present modified example mainly includes the moving image data obtaining unit 101, the feature amount extracting unit 103, the moving image data re-encoding unit 105, the moving image data recording unit 107, the memory unit 109, a feature amount data transmitting/receiving unit 151 and a duplicate content searching unit 153.

Here, the moving image data obtaining unit 101, the feature amount extracting unit 103, the moving image data re-encoding unit 105, the moving image data recording unit 107 and the memory unit 109 according to the present modified example have substantially the same configuration and effects as those of the respective processing units disposed at the moving image recording apparatus 10 according to the first embodiment. Accordingly, the detailed description of these processing units will not be repeated in the following.

The feature amount data transmitting/receiving unit 151 is actualized with a CPU, a ROM, a RAM, a communication device and the like, for example. The feature amount data transmitting/receiving unit 151 obtains the feature amount data recorded in the memory unit 109 and transmits to another moving image recording apparatus 10 and receives the feature amount data transmitted from another moving image recording apparatus 10. When the feature amount data transmitted from another moving image recording apparatus 10 is received, the feature amount data transmitting/receiving unit 151 transmits the received feature amount data to the later-mentioned duplicate content searching unit 153.

The duplicate content searching unit 153 is actualized with a CPU, a ROM, a RAM, a communication device and the like, for example. The duplicate content searching unit 153 according to the present modified example performs searching of the duplicate contents by utilizing the feature amount data recorded in another moving image recording apparatus 10 as well as the feature amount data recorded in the memory unit 109. Except for the above, the duplicate content searching unit 153 has substantially the same functions and effects as the duplicate content searching unit 111 according to the first embodiment. In the following, the duplicate content searching unit 153 according to the present modified example will be briefly described.

When starting searching of the duplicate contents, the duplicate content searching unit 153 (more specifically, the feature amount data obtaining unit) obtains all of the feature amount data recorded in the memory unit 109. In addition, the duplicate content searching unit 153 requests another moving image recording apparatus 10 capable of performing mutual communication to transmit all of the recorded feature amount data. When the feature amount data of the other moving image recording apparatus 10 is transmitted from the feature amount data transmitting/receiving unit 151, the duplicate content searching unit 153 performs the process of searching the duplicate contents together with the feature amount data obtained from the memory unit 109.

As a result of the searching, when a program supposed to have approximately the same nature as that of the program which is completed to be recorded is previously recorded in the other moving image recording apparatus, the duplicate content searching unit 153 deletes the moving image data recorded in one apparatus, so that duplication is eliminated from the moving image data.

Prior to performing the process of deleting the duplicate content, the duplicate content searching unit 153 may call attention to a user by outputting a message such as "High probability of being the same nature between program A in recorder B and program N in this equipment. Delete either one?".

For example, when two or more moving image recording apparatuses 10 exist at home, it is adequate that one program is recorded in any one of the moving image recording apparatuses 10 in most cases. In view of the above, by connecting the plurality of moving image recording apparatuses 10 with a network and interchanging the feature amount data of each program having extremely small data size, duplicate programs can be searched across the plurality of moving image recording apparatuses 10. Accordingly, with the moving image recording apparatus 10 according to the present modified example, the storage device can be utilized further effectively and user's convenience can be further improved.

In the following, specific description is made on the case of transmitting and receiving of the feature amount data between two moving image recording apparatuses 10 and searching of the duplicate contents with reference to FIG. 10. FIG. 10 illustrates only a part excerpted from the processing units disposed at the moving image recording apparatus 10.

For example, it is assumed that recording of moving image data corresponding to a program is completed in the moving image recording apparatus 10A. At that time, the duplicate content searching unit 153 of the moving image recording apparatus 10A requests the moving image recording apparatus 10B to transmit feature amount data kept by the moving image recording apparatus 10B.

When receiving a request of transmitting the feature amount data, the feature amount data transmitting/receiving unit 151 of the moving image recording apparatus 10B obtains the feature amount data from the memory unit 109 and transmits to the moving image recording apparatus 10A.

When the feature amount data transmitted from the moving image recording apparatus 10B is received, the feature amount data transmitting/receiving unit 151 of the moving image recording apparatus 10A transmits to the duplicate content searching unit 153. The duplicate content searching unit 153 of the moving image recording apparatus 10A starts the process of searching the duplicate contents based on the own-kept feature amount data and the feature amount data kept by the moving image recording apparatus 10B.

As a result of the process of searching duplicate contents, there may be a case that the duplicate contents are found across the moving image recording apparatus 10A and the moving image recording apparatus 10B and that the moving image data recorded in the moving image recording apparatus 10B is to be deleted. In this case, the duplicate content searching unit 153 of the moving image recording apparatus 10A requests the moving image recording apparatus 10B to delete the moving image data. The duplicate content searching unit 153 of the moving image recording apparatus 10B which receives the request deletes the specified moving image data from the own memory unit 109.

By performing such processes, duplicate programs can be searched across the plurality of moving image recording apparatuses 10.

In the above, an example of functions of the moving image recording apparatus 10 according to the present modified example has been described. Each of the above structural components may be constituted with general members and circuits or may be constituted with hardware specially prepared for the function thereof. Instead, it is also possible that all of the functions of the respective structural components are performed by a CPU and the like. The configuration to be adopted can be appropriately modified in accordance with the technology level at the time of actualizing the present modified example.

Here, it is also possible to prepare a computer program to actualize the above respective functions of the moving image recording apparatus according to the present modified example and to mount the program on a personal computer and the like. Further, it is also possible to provide a recording medium capable of being read by a computer having such a computer program stored. For example, the recording medium is a magnetic disk, an optical disk, an optical magnetic disk, a flash memory or the like. Furthermore, the above computer program may be delivered via a network, for example, without utilizing a recording medium.

(Hardware Configuration)

Next, the hardware configuration of the moving image recording apparatuses 10 according to the embodiment of the present invention will be described in detail with reference to FIG. 11. FIG. 11 is a block diagram for illustrating the hardware configuration of the moving image recording apparatuses 10 according to the embodiment of the present invention.

The moving image recording apparatuses 10 mainly includes a CPU 901, a ROM 903, and a RAM 905. Furthermore, the moving image recording apparatuses 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the moving image recording apparatuses 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the moving image recording apparatuses 10. Furthermore, the input device 915 generates an input signal based on, for example, information which is input by a user with the above operation means, and is configured from an input control circuit for outputting the input signal to the CPU 901. The user of the moving image recording apparatuses 10 can input various data to the moving image recording apparatuses 10 and can instruct the moving image recording apparatuses 10 to perform processings by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the moving image recording apparatuses 10. More specifically, the display device displays, in the form of texts or images, a result obtained by various processes performed by the moving image recording apparatuses 10. On the other hand, the audio output device converts an audio signal such as reproduced audio data and sound data into an analog signal, and outputs the analog signal.

The storage device 919 is a device for storing data configured as an example of a storage unit of the moving image recording apparatuses 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the moving image recording apparatuses 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the moving image recording apparatuses 10. Examples of the connection port 923 include a USB (Universal Serial Bus) port, an IEEE1394 port such as i.Link, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the moving image recording apparatuses 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the moving image recording apparatuses 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

SUMMARY

As described above, an embodiment of the present invention relates to a moving image recording apparatus to obtain encoded moving image data and to record in a storage device such as a hard disk drive. At the time of obtaining and recording the moving image data, the moving image recording apparatus according to an embodiment of the present invention extracts a feature amount characterizing the moving image from the moving image data and records the feature amount along with the moving image data. Further, the moving image recording apparatus according to the embodiment of the present invention performs comparison calculation by utilizing the recorded feature amount data and searches duplicate moving image data having the same nature. Accordingly, the moving image recording apparatus according to the present invention can effectively detect duplication of moving image data with a small calculation amount. In addition, the storage device thereof can be effectively utilized without burdening a user by urging deletion of duplication as notifying to the user.

It should be understood by those skilled in the art that various modifications, combinations, sub-combinations and alterations may occur depending on design requirements and other factors insofar as they are within the scope of the appended claims or the equivalents thereof.

For example, in the description of the above embodiment, the feature amount data extracted by the feature amount extracting unit 103 is stored in the memory unit 109. However, the present invention is not limited to the above.

For example, it is also possible that the feature amount data may be extracted by the feature amount extracting unit 103 every time when the duplicate content searching unit 111 performs searching of duplicate contents without being recorded in the memory unit 109.

What is claimed is:

1. A moving image recording apparatus comprising:
a feature amount extracting unit operable to extract plural types of feature amount data from moving image data, wherein the plural types of feature amount data relate to feature amounts of the moving image data, wherein one of the plural types of feature amount data corresponds to commercial message segment information relating to time at which a commercial is detected in the moving image data;
a memory unit operable to record the extracted plural types of feature amount data and the moving image data; and
a duplicate content searching unit operable to:
delete the commercial message segment information of each detected commercial and corresponding extracted plural types of feature amount data from the moving image data to determine new plural types of feature amount data;
correct elapsed time information for the new plural types of feature amount data relating to the moving image data to determine new time information having a start time of the recorded moving image data as a reference time; and
search duplicate content among a plurality of moving image data stored in the memory unit based at least in part on the new time information of the new plural types of feature amount data of the moving image data.

2. The moving image recording apparatus according to claim 1,
wherein the feature amount extracting unit extracts feature amount data relating to audio data contained in the moving image data and feature amount data relating to image data contained in the moving image data.

3. The moving image recording apparatus according to claim 1,
wherein the duplicate content searching unit deletes the corresponding moving image data from the memory unit until the moving image data is not duplicated, in a case that the duplicate content exists in the memory unit.

4. The moving image recording apparatus according to claim 1,
wherein the duplicate content searching unit calculates similarity degree between the feature amount data being associated respectively with arbitrary two of the moving image data and determines that the duplicate content exists when the similarity degree is equal to or larger than a predetermined threshold value.

5. The moving image recording apparatus according to claim 2,
wherein the feature amount extracting unit extracts, as the feature amount data, volume information obtained by sampling audio data contained in the moving image data at predetermined intervals and caption information relating to time at which a caption is displayed in the moving image corresponding to the moving image data.

6. The moving image recording apparatus according to claim 4,
wherein the duplicate content searching unit calculates the similarity degree by utilizing some of the moving image data corresponding at least to a time segment being a part of the feature amount data.

7. The moving image recording apparatus according to claim 6,
wherein the duplicate content searching unit calculates the similarity degree excluding the time at which the commercial is detected from the extracted commercial message segment information feature amount data.

8. The moving image recording apparatus according to claim 1,
wherein the feature amount extracting unit further extracts, as the feature amount data, scene change information relating to time at which a scene change occurs in the moving image corresponding to the moving image data.

9. The moving image recording apparatus according to claim 1,
wherein the feature amount extracting unit further extracts, as the feature amount data, flesh color detection information relating to time at which a flesh color part being equal to or larger than a predetermined ratio occurs in the moving image corresponding to the moving image data.

10. The moving image recording apparatus according to claim 1, further comprising:
a feature amount data transmitting/receiving unit which performs transmitting and receiving of the feature amount data with an information processing apparatus arranged outside the moving image recording apparatus,
wherein the duplicate content searching unit performs searching of the duplicate content by further utilizing the feature amount data obtained from the information processing apparatus.

11. A moving image recording method comprising:
in a moving image recording apparatus:
extracting plural types of feature amount data from moving image data, wherein the plural types of feature amount data relate to feature amounts of moving image data from the moving image data, wherein one of the plural types of feature amount data corresponds to commercial message segment information relating to time at which a commercial is detected in the moving image data;

recording the extracted plural types of feature amount data and the moving image data in a memory unit;

deleting the commercial message segment information of each detected commercial and corresponding extracted plural types of feature amount data from the moving image data to determine new plural types of feature amount data;

correcting elapsed time information for the new plural types of feature amount data relating to the moving image data to determine new time information having a start time of the recorded moving image data as a reference time;

and searching duplicate content among a plurality of the moving image data stored in the memory unit based at least in part on the new time information of the new plural types of feature amount data of the moving image data.

12. A non-transitory computer-readable medium having stored thereon, a program, the program being executable by a processing unit in a moving image recording apparatus, the program causing the processing unit to perform steps comprising:

extracting plural types of feature amount data from moving image data, wherein the plural types of feature amount data relate to feature amounts of moving image data, wherein one of the plural types of feature amount data corresponds to commercial message segment information relating to time at which a commercial is detected in the moving image data;

recording the extracted plural types of feature amount data and the moving image data in a memory unit;

deleting the commercial message segment information of each detected commercial and corresponding extracted plural types of feature amount data from the moving image data to determine new plural types of feature amount data;

correcting elapsed time information for the new plural types of feature amount data relating to the moving image data to determine new time information having a start time of the recorded moving image data as a reference time;

and searching duplicate content among a plurality of the recorded moving image data based at least in part on the new time information of the new plural types of feature amount data of the moving image data.

13. The non-transitory computer-readable medium according to claim 12, further comprising calculating similarity degree between the feature amount data being associated respectively with arbitrary two of the moving image data and determines that the duplicate content exist when the similarity degree is equal to or larger than a predetermined threshold value.

14. The non-transitory computer-readable medium according to claim 13, wherein the similarity degree is calculated based on one of: a cross-correlation value or a difference sum.

15. The non-transitory computer-readable medium according to claim 12, further comprising:

performing transmitting and receiving of the feature amount data with an information processing apparatus arranged outside the moving image recording apparatus, wherein the duplicate content searching unit performs searching of the duplicate content by further utilizing the feature amount data obtained from the information processing apparatus.

16. The non-transitory computer-readable medium according to claim 15, further comprising requesting the information processing apparatus to delete the duplicate content from the information processing apparatus.

17. The moving image recording apparatus according to claim 1, wherein the new plural types of feature amount data comprise corrected time information after the detected commercial message segment information and corresponding extracted plural types of feature amount data are deleted from the moving image data.

\* \* \* \* \*